United States Patent
Kumagai et al.

(10) Patent No.: US 7,810,700 B2
(45) Date of Patent: Oct. 12, 2010

(54) HEAT TREATING FRICTION STIR WELDED ALUMINUM ALLOY MEMBERS AND JOINED PRODUCT

(75) Inventors: Masaki Kumagai, Nagoya (JP); Tadashi Minoda, Nagoya (JP); Koji Tanaka, Nagoya (JP)

(73) Assignee: Sumitomo Light Metal Industries, Ltd., Minato-Ku (JP)

( * ) Notice: Subject to any disclaimer, the term of this patent is extended or adjusted under 35 U.S.C. 154(b) by 317 days.

(21) Appl. No.: 11/305,446

(22) Filed: Dec. 15, 2005

(65) Prior Publication Data

US 2007/0138235 A1 Jun. 21, 2007

(51) Int. Cl.
*B23K 20/12* (2006.01)
*B23K 37/00* (2006.01)

(52) U.S. Cl. ..................... 228/112.1; 228/2.1
(58) Field of Classification Search ................ 228/2.1, 228/112.1
See application file for complete search history.

(56) References Cited

U.S. PATENT DOCUMENTS

| | | | |
|---|---|---|---|
| 6,168,067 B1 * | 1/2001 | Waldron et al. | 228/112.1 |
| 2004/0056075 A1 * | 3/2004 | Gheorghe | 228/199 |

FOREIGN PATENT DOCUMENTS

| | | | |
|---|---|---|---|
| JP | 05-117826 A1 | 5/1993 | |
| JP | 08-246116 A1 | 9/1996 | |
| JP | 11-104860 A1 | 4/1999 | |
| JP | 11-199994 A1 | 7/1999 | |
| JP | 2000-061663 A1 | 2/2000 | |
| JP | 2000061663 A | * 2/2000 | |
| JP | 2002-294381 A1 | 10/2002 | |
| JP | 2002-346770 A1 | 12/2002 | |
| JP | 2004360054 A | * 12/2004 | |
| JP | 2005059066 A | * 3/2005 | |
| JP | 2005131679 A | * 5/2005 | |
| JP | 2005131701 A | * 5/2005 | |
| JP | 2005138125 A | * 6/2005 | |

OTHER PUBLICATIONS

Heinz et al., Charaterization of a friction-stir-welded aluminum alloy 6013, Jun. 2002, Metallurgical and Materials Transactions B, vol. 33, No. 3, Totten et al., Hnadbook of Aluminum vol. 1, p. 489-498.*

(Continued)

*Primary Examiner*—Jessica L Ward
*Assistant Examiner*—Carlos Gamino
(74) *Attorney, Agent, or Firm*—Burr & Brown (57) ABSTRACT

A method of joining aluminum alloy members, including the steps of: obtaining a joined body including: (a) contacting aluminum alloy members each made of a 6000 series aluminum alloy with T4 temper; and (b) performing a friction stir welding operation on a contact portion of the aluminum alloy members at which they are held in contact with each other, so as to form a stir zone at the contact portion; and performing, on the obtained joined body, an underaging treatment which is an artificial aging treatment and which is completed before hardness of the stir zone reaches maximum hardness, the underaging treatment being performed before GP zones are formed at the stir zone of the joined body.

7 Claims, 3 Drawing Sheets

OTHER PUBLICATIONS

Totten et al., Handbook of Aluminum vol. 1, Marcel Dekker, Inc., 2003.*

Su et al., Microstructural investigation of friction stir welded 7050-T651 aluminum, Feb. 7 2003, Acta Materialia, vol. 51, Issue 3, p. 713-729.*

John et al., Residual stress effects on near-theshold fatigue crack growth in friction stir welds in aerospace alloys, Sep.-Nov. 2003, International Journal of Fatigue, vol. 25, Issue 9-11, p. 939-948.*

Sato et al., Post-weld formability of friction stir welded Al alloy 5052, Mar. 25, 2004, Material Science and Engineering, vol. 369, Issue 1-2, p. 138-143.*

Mishra et al., Friction stir welding and processing, Material Science and Engineering, vol. 56, Issue 1-2, p. 1-78.*

Cabibbo et al., TEM analysis of a friction stir-welded butt joint of AL-SI-MG- alloys, Aug. 28, 2003, Materials Chemistry and Physics, vol. 81, Issue 2-3, p. 289-292.*

U.S. Appl. No. 11/305,547, filed Dec. 15, 2005, Kumagai et al.

* cited by examiner

HEAT TREATING FRICTION STIR WELDED ALUMINUM ALLOY MEMBERS AND JOINED PRODUCT

The present application is based on Japanese Patent Application No. 2003-375238 filed on Nov. 5, 2003, the contents of which are incorporated herein by reference.

BACKGROUND OF THE INVENTION

1. Field of the Invention

The present invention relates in general to a method of joining aluminum alloy members and a joined product for press forming. More particularly, the invention relates to such a method of advantageously joining aluminum alloy members made of a 6000 series aluminum alloy (Al—Mg—Si series alloy) with T4 temper and a joined product for press forming obtained utilizing such a method.

2. Discussion of Related Art

Conventionally, so-called aluminum alloy members such as plate members, extruded members and the like made of various kinds of aluminum alloys are subjected to press forming so as to produce various press products such as articles for daily use, machinery parts, building materials, etc. In recent years, products required to exhibit excellent strength such as inner and outer members of body panels of automotive vehicles and wheels are obtained by press forming of the aluminum alloy members. As aluminum alloy members that give such press products, there are widely used materials formed of 6000 series aluminum alloys which have been subjected to a T4 treatment having both of a high degree of strength and excellent workability.

As well known, the 6000 series aluminum alloy is inferior in welding property, so that a joined product obtained by joining, according to a fusion welding method, aluminum alloy members formed of the 6000 series aluminum alloy with T4 temper inevitably suffers from a decrease in its bonding or joining strength In view of the above, for increasing the bonding strength of the joined product to be obtained by the fusion welding of the 6000 series aluminum alloy members, various techniques are proposed in JP-A-5-117826, JP-A-8-246116 and JP-A-11-199994, for instance. In the disclosed techniques, a joined product obtained by joining the 6000 series aluminum alloy members according to the fusion welding method is subjected to a heat treatment at a predetermined temperature for a suitable time or an artificial aging treatment at a heating temperature within a predetermined range, thereby increasing strength at a welded region. Even if such techniques are employed, it is difficult to avoid occurrence of bonding defects, at the welded region, such as blow holes and involvement of slag which are peculiar to the fusion welding.

On the other hand, an increasing attention has been recently drawn to a friction stir welding process that is a sort of solid-phase welding or joining process in which material members are joined together in a solid-phase without being molten by heat. The friction stir welding process is employed for joining various aluminum alloy members. In view of the problem in the fusion welding described above, various techniques have been proposed in JP-A-11-104860, JP-A-2000-61663, JP-A-2002-346770 and JP-A-2002-294381, for instance. In the disclosed techniques, the 6000 series aluminum alloy members are joined together by the friction stir welding process to form a joined product and the obtained joined product is subjected to an artificial aging treatment at various temperature values for the purpose of improving the bonding or joining strength of the joined product.

As a result of various studies made by the inventors of the present invention on the characteristic of the joined product obtained according to the proposed techniques, i.e., the joined product obtained first by joining the 6000 series aluminum alloy members according to the friction stir welding process and then performing the artificial aging treatment thereof, it was realized that the welded region (stir zone) of the joined product was hardened by the artificial aging treatment, so that the bonding strength of the joined product was improved. It was, however, turned out the following: Heat-affected zones respectively located within considerably narrow areas at boundary portions between the stir zone and respective base material portions have hardness lower than those of the stir zone and the base material portions, so that a stress concentrates on the heat-affected zones when the joined body is subjected to press forming. Consequently, the heat-affected zones tend to easily fracture or break, leading to insufficient elongation of the joined product as a whole.

One (JP-A-2002-294381) of the aforementioned documents discloses the following technique: Among the 6000 series aluminum alloy members, excess Si-content type 6000 series aluminum alloy members are joined by the friction stir welding process to provide a joined product. The obtained joined product is subjected to the artificial aging treatment at a temperature of not higher than 180° C., so that joint strength of the stir zone is restored by 70% or larger with respect to strength of the base material while joint elongation of the stir zone is restored by 50% or larger with respect to elongation of the base material. As a consequence, it is possible to avoid occurrence of cracking at the stir zone and the heat-affected zones in press forming of the joined product, thereby enhancing press formability of the joined product.

According to the studies made by the inventors, however, where such a technique is employed, the hardness of the base material portions is increased, by the artificial aging treatment on the joined product, by an amount corresponding to the increase in the hardness of the stir zone and the heat-affected zone, undesirably deteriorating excellent workability characteristic to the 6000 aluminum alloy. Accordingly, the amount of elongation by deformation of the base material in press forming of the joined product is inevitably decreased, so that the proposed technique does not assure a satisfactory effect of improving the press formability of the joined product as a whole.

SUMMARY OF THE INVENTION

The present invention has been made in view of the situations mentioned above. It is therefore an object of the present invention to provide a method of joining aluminum alloy members in which the 6000 series aluminum alloy members with T4 temper can be joined together with excellent bonding or joining strength and which effectively increases press formability of a joined product obtained by joining the aluminum alloy members. Another object of the invention is to provide a joined product for press forming having excellent bonding or joining strength and a high degree of press formability.

To achieve the objects indicated above, the inventors of the invention have made an extensive study from various angles on the artificial aging treatment performed on a joined product obtained by the friction stir welding of the 6000 series aluminum alloy members subjected to the T4 treatment and have found the following: In such a joined product, the base material portions have, as a result of the T4 treatment, a metal structure called GP zones (or clusters) in which fine compounds of Mg atoms and Si atoms are formed whereas the stir zone has a metal structure that is solutionized, i.e., solutionaized structure in which, owing to the heat generated in the friction stir welding operation on the stir zone, the Mg atoms and the Si atoms are re-solubilized, so that the GP zones are extinguished. Further, the heat-affected zones has a metal structure in which re-solubilization of the Mg atoms and the Si atoms is incomplete because the temperature of the heat-affected zones does not become as high as that of the stir zone in the friction stir welding operation. Therefore, the difference in the metal structure among the base material portions, the stir zone and the heat-affected zones causes a difference in a rate of aging (aging speed) among them when the joined product is subjected to the artificial aging treatment. As a result, it is turned out that a time period required until hardness (strength) reaches maximum by the artificial aging treatment after initiation of the artificial aging treatment differs among the base material portion, the stir zone and the heat-affected zones. At the same time, such a difference in the metal structure among them gradually extinguishes as natural aging progresses after the friction stir welding operation, so that the metal structures of the stir zone and the heat-affected zones become similar to that of the base material portions in which the GP zones are formed.

Focusing on the above, the inventors have made a further extensive study and have found the following: By performing, prior to formation of the GP zones at the stir zone, a so-called underaging treatment which is an artificial aging treatment and which is completed before hardness (strength) of the stir zone reaches maximum hardness, it is possible to reliably control the respective metal structures of the base material portions, the stir zone and the heat-affected zones and relationship in hardness among those, contributing to an increase in the elongation deformation amount of the joined product in the press forming.

The present invention has been accomplished based on the findings described above. To achieve the object indicated above, the present invention provides a method of joining aluminum alloy members, comprising the steps of: obtaining a joined body including: (a) contacting aluminum alloy members each made of a 6000 series aluminum alloy with T4 temper; and (b) performing a friction stir welding operation on a contact portion of the aluminum alloy members at which they are held in contact with each other, so as to form a stir zone at the contact portion; and performing, on the obtained joined body, an underaging treatment which is an artificial aging treatment and which is completed before hardness of the stir zone reaches maximum hardness, the underaging treatment being performed before GP zones are formed at the stir zone of the joined body.

According to the present method described above, the 6000 series aluminum alloy members which have been subjected to a T4 treatment are joined together according to the friction stir welding process. Accordingly, unlike the fusion welding process, the friction stir welding process permits formation of a sound stir zone with no welding or bonding defects peculiar to the fusion welding process.

Further, the joined body is subjected, before the GP zones are formed in the sound stir zone, to the underaging treatment which is an artificial aging treatment and which is completed before the hardness of the stir zone reaches maximum. Therefore, it is possible to control the respective metal structures of the stir zone, the heat-affected zones and the base material portions and the relationship in hardness among them.

Described more specifically, as a result of the artificial aging treatment performed on the T4 temper 6000 aluminum alloy members, the aluminum alloy members have, with the progress of aging, the metal structure in which the GP zones formed by the T4 treatment are decomposed and $Mg_2Si$ compounds are precipitated. Further, the hardness of such a metal structure increases with an increase in the precipitation size of the $Mg_2Si$ compounds within a range of the critical size that contributes to the strength. In the meantime, where the artificial aging treatment is performed on the joined body obtained by joining together the aluminum alloy members, the aging speed is the highest at the stir zone and the next highest at the heat-affected zones because no GP zones are formed at the stir zone and the heat-affected zones have less GP zones. The aging speed is the lowest at the base material portions.

Therefore, where the underaging treatment which is an artificial treatment and which is completed before the hardness of the stir zone reaches maximum hardness is performed on the joined body of the T4 temper 6000 series aluminum alloy members, the precipitation size of the $Mg_2Si$ compounds in the structure of the stir zone is larger than those of the heat-affected zones and the base material portions because of the aging speed at the stir zone higher than those at the heat-affected zones and the base material portions. Accordingly, the hardness of the stir zone becomes higher than those of the heat-affected zones and the base material portions. Since the aging speed at the heat-affected zones is higher than that at the base material portions and lower than that at the stir zone, the precipitation size of the $Mg_2Si$ compounds in the structure of the heat-affected zones is larger than that of the base material portions and smaller than that of the stir zone. Accordingly, the hardness of the heat-affected zones is higher than that of the base material portions and smaller than that of the stir zone. Further, since the aging speed at the base material portions is lower than those at the base material portions and the stir zone, the precipitation size of the $Mg_2Si$ compounds in the structure of the base material portions is smaller than those of the stir zone and the heat-affected zones. Accordingly, the hardness of the base material portions is lower than those of the stir zone and the heat-affected zones. Namely, the underaging treatment in the present invention is an artificial aging treatment and is completed in a state in which the hardness of the stir zone and the hardness of the heat-affected zones are made larger than the hardness of the base material portions and before the hardness of the stir zone reaches maximum hardness.

According to the present method, the hardness of the stir zone and the hardness of the heat-affected zones of the joined body obtained by joining the 6000 series aluminum alloy members with T4 temper can be made higher than the hardness of the base material portions, thereby effectively increasing bonding or joining strength of the joined body. In addition, because the hardness of the heat-affected zones respectively located within narrow areas at the boundary portions between the stir zone and the respective base material portions is prevented, with high reliability, from becoming the lowest, it is possible to avoid stress concentration on the heat-affected zones, thereby preventing the heat-affected zones from easily fracturing.

Moreover, in the present method, the hardness of the stir zone and the hardness of the heat-affected zones are increased whereas an amount of increase in the hardness of the base material portions can be minimized. Accordingly, the present method prevents the hardness of the base material portions from becoming higher than necessary and thereby prevents excellent workability possessed by the 6000 aluminum alloy members with T4 temper from being deteriorated at the base material portions.

Thus, the present method is capable of joining the 6000 aluminum alloy members with T4 temper with good joining or bonding strength and effectively enhancing the press formability of the joined body with excellent joining or bonding strength.

In a first preferred form of the present method described above, the underaging treatment is a heat treatment in which the joined body is heated at a temperature of 150-230° C. for not longer than four hours.

In a second preferred form of the present method described above, the underaging treatment is performed using a heating means selected from a salt bath, an oil bath, an air-heating furnace, an iron, infrared heating and induction heating.

According to the above-indicated first and second preferred forms, the underaging treatment can be performed with high stability and high reliability, assuring the excellent effect mentioned above.

In a third preferred form of the present method described above, time period from completion of the friction stir welding operation in the step of obtaining a joined body to initiation of the underaging treatment on the joined body is within 24 hours.

According to the above-indicated third preferred form, a time period during which natural aging caused after the completion of the friction stir welding operation proceeds is limited to not longer than 24 hours. Accordingly, at a stage before the underaging treatment is carried out, the respective metal structures of the stir zone, the heat-affected zones and the base material portions are advantageously prevented from becoming uniform by the natural aging. Therefore, there is assured a difference in the aging speed among the stir zone, the heat-affected zones and the base material portions based on the non-uniformity in the respective metal structures of those, making it possible to control, by implementation of the underaging treatment on the joined body, the respective metal structures of the stir zone, the heat-affected zones and the base material portions and the relationship in the hardness among those. Consequently, the bonding or joining strength and the press formability of the joined body obtained by joining the 6000 series aluminum alloy members with T4 temper can be effectively improved.

In a fourth preferred form of the present method described above, the underaging treatment is sequentially performed on a portion of the aluminum alloy members that has been formed into the joined body by formation of the stir zone, following the formation of the stir zone at the contact portion of the aluminum alloy members by performing the friction stir welding operation on the contact portion.

According to the above-indicated fourth preferred form, the friction stir welding operation on the contact portion of the 6000 series aluminum alloy members with T4 temper and the underaging treatment on the joined body obtained by the friction stir welding operation are sequentially and continuously carried out, thereby increasing efficiency with which the aluminum alloy members are joined. Therefore, this arrangement assures efficient and speedy production of the joined body with enhanced bonding strength and good press formability.

To achieve the object indicated above, the present invention provides a joined product for press forming constituted by a joined body that is obtained by integrally joining aluminum alloy members each made of a 6000 series aluminum alloy with T4 temper, at a contact portion thereof at which the aluminum alloy members are held in contact with each other, such that a stir zone is formed at the contact portion, wherein the stir zone is formed by performing a friction stir welding operation on the contact portion of the aluminum alloy members; and the joined body is subjected, before GP zones are formed at the stir zone, to an underaging treatment which is an artificial aging treatment and which is completed before hardness of the stir zone reaches maximum hardness, so that the hardness of the stir zone is increased to a level higher than that of base material portions of the aluminum alloy members.

The joined product for press forming is provided by the joined body obtained by the friction stir welding of the 6000 series aluminum alloy members with T4 temper and is constituted such that the joined body is subjected to the underaging treatment before the GP zones are formed at the stir zone, so that the hardness of the joined body is locally changed. Therefore, as in the case in which the 6000 series aluminum alloy members with T4 temper are joined together according to the aforementioned method that assures excellent effect described above, the hardness in the joined product is arranged such that the hardness of the stir zone is the highest, the hardness of the heat-affected zones is the next highest, and the hardness of the base material portions is the lowest.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Referring to the drawings, there will be explained in detail a method of joining aluminum alloy members and a structure of a joined product of the aluminum alloy members, according to the present invention.

Figure 1:
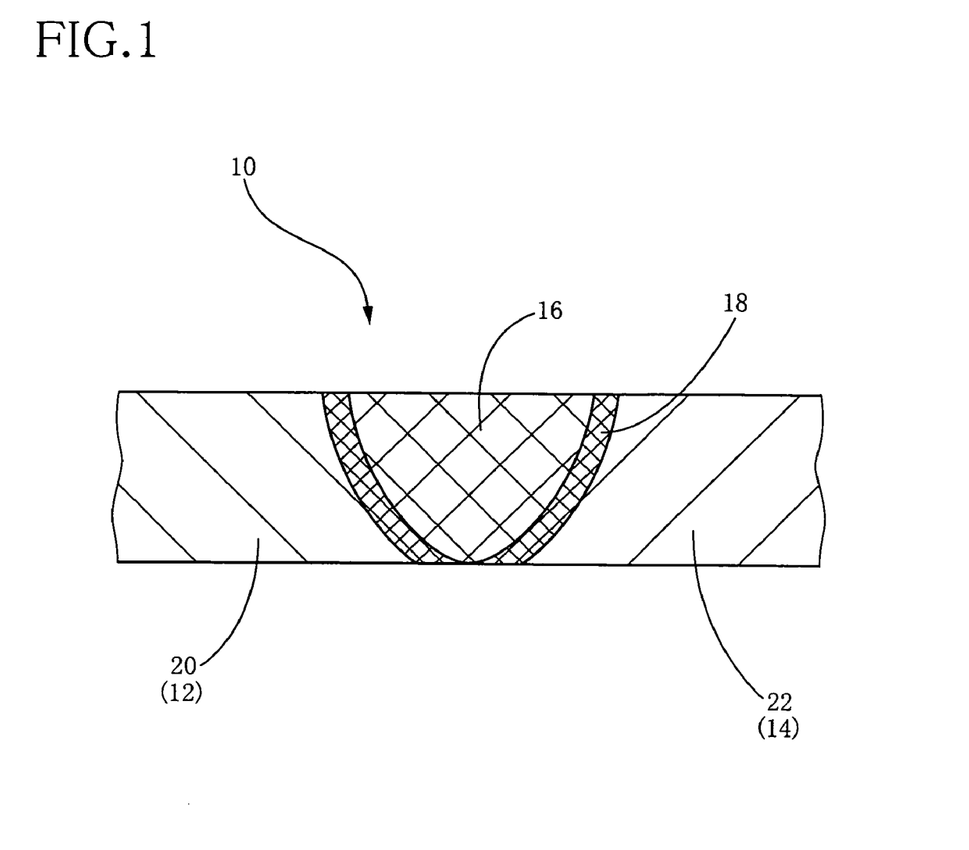
FIG. 1 is a fragmentary enlarged view in vertical cross section showing an aluminum blank for press forming that is obtained by joining aluminum alloy members according to the present method.

Referring first to FIG. 1, there is schematically shown in vertical cross section a joined product obtained by joining the aluminum alloy members according to the present joining method, in the form of a tailored blank 10 as the joined product for press forming that provides an inner member of a body panel of an inner member of automotive vehicles. As shown in FIG. 1, the tailored blank 10 is constituted by two planar aluminum base material members 12, 14 which are integrally joined together such that the two base material members 12, 14 are butted to each other at respective end portions and a butted portion of the two members 12, 14 is subjected to a friction stir welding operation so as to form a stir zone 16.

While not shown in FIG. 1, the two planar aluminum base material members 12, 14 are joined together over an entire length of the butted portion, whereby the stir zone 16 is formed so as to extend continuously over the entire length along the butted portion. In the tailored blank 10, respective limited narrow areas located outwardly of the stir zone 16 are made as heat-affected zones 18 which have been inevitably softened by the heat generated upon the friction stir welding. Further, portions of the tailored blank 10 other than the stir zone 16 and the heat-affected zones 18 are base material portions 20, 22 originating from the aluminum base material members 12, 14.

Here, as each of the two planar aluminum base material members 12, 14 that provide the tailored blank 10, there is used a so-called T4 member of a 6000 series aluminum alloy that is obtained by performing a T4 treatment on an Al—Mg—Si series aluminum alloy called a 6000 series aluminum alloy in the International Designation System for Wrought Aluminum and Wrought Aluminum Alloys. The kind of the alloy that gives the aluminum base material members 12, 14 is not limited, as long as the alloy is the 6000 series aluminum alloy with T4 temper. Namely, each of the aluminum base material members 12, 14 is constituted by a plate member obtained by performing the T4 treatment on 6000 series aluminum alloy suitably selected from those having various chemical compositions such as aluminum alloys with a small Si content including an AA 6061 alloy, an AA 6063, etc., and aluminum alloys with a large Si content including an AA 6016 alloy, an AA6111 alloy, etc. It is noted that the two aluminum base material members 12, 14 may be made of the same kind of the 6000 series aluminum alloy or mutually different kinds of the 6000 series aluminum alloys.

The T4 member of the 6000 series aluminum alloy that gives the aluminum base material members 12, 14 may be produced according to any known method. For instance, the 6000 series aluminum alloy is cast into an ingot by direct chill casting according to an ordinary DC method. After the obtained cast ingot has been subjected to a homogenization heat treatment, hot rolling and cold rolling are performed, thereby producing a rolled plate. A rolled plate may be produced by performing cold rolling on a continuous cast rolled plate obtained by a CC method (strip casting method). Anyway, after the thus produced rolled plate has been subjected to intermediate annealing before or during cold rolling, as needed, it is subjected to a solution heat treatment and subsequent quenching, and then naturally aged, whereby the T4 member is obtained. The thus obtained T4 member of the 6000 series aluminum alloy is used as each aluminum base material member 12, 14.

Where the T4 member of the 6000 series aluminum alloy is used for a blank for press forming, pre-aging generally at a temperature of 40-120° C. for a time period from about one hour to about 24 hours may be performed prior to natural aging after quenching, for the purpose of imparting bake hardenability that permits improvement of the hardness by a paint baking treatment conducted after press forming. In performing such pre-aging, the heating temperature is limited advantageously to 50° C. or lower for the following reasons: In the present embodiment, as explained below, an underaging treatment is performed after the two aluminum base material members 12, 14 formed of the T4 temper 6000 series aluminum alloy have been joined by the friction stir welding. Where the aluminum base material members 12, 14 have been subjected to the pre-aging at a temperature exceeding 50° C. prior to the underaging treatment, it is difficult to obtain intended effects attained by the underaging treatment. It is noted that the T4 member of the 6000 series aluminum alloy used as each aluminum base material member 12, 14 is not limited to the rolled plate, but may be a T4 member made of an extruded member obtained by a known extrusion operation and subjected to the solution heat treatment, the quenching and the natural aging.

The thickness of each aluminum base material member 12, 14 is not particularly limited. The two aluminum base material members 12, 14 may have the same thickness or mutually different thickness. Where the two aluminum base material members 12, 14 have mutually different thickness, the tailored blank 10 obtained by joining such members 12, 14 have a thick portion given by one 12(14) of the two members with the larger thickness and a thin portion given by the other 14(12) of the two members with the smaller thickness. In this respect, where the tailored blank 10 has such thick portion and thin portion, the strength and rigidity of the tailored blank 10 are made larger at the thick portion than at the thin portion by a degree corresponding to the thickness difference therebetween. In addition, the weight of the tailored blank 10 is reduced owing to the thin portion. Accordingly, the strength and the rigidity can be increased at desired portions in the inner member of the body panel of automobiles obtained by the press forming operation on the tailored blank 10 while, at the same time, the reduction in the weight of the inner member is attained.

In the present embodiment, the two aluminum base material members 12, 14 formed of the T4 temper 6000 series aluminum alloy described above are subjected to the friction stir welding operation so as to obtain a joined body and the obtained joined body is subjected to the underaging treatment, whereby the two aluminum base material members 12, 14 are joined together to provide the tailored blank 10. This is the characteristic of the invention.

Figure 2:
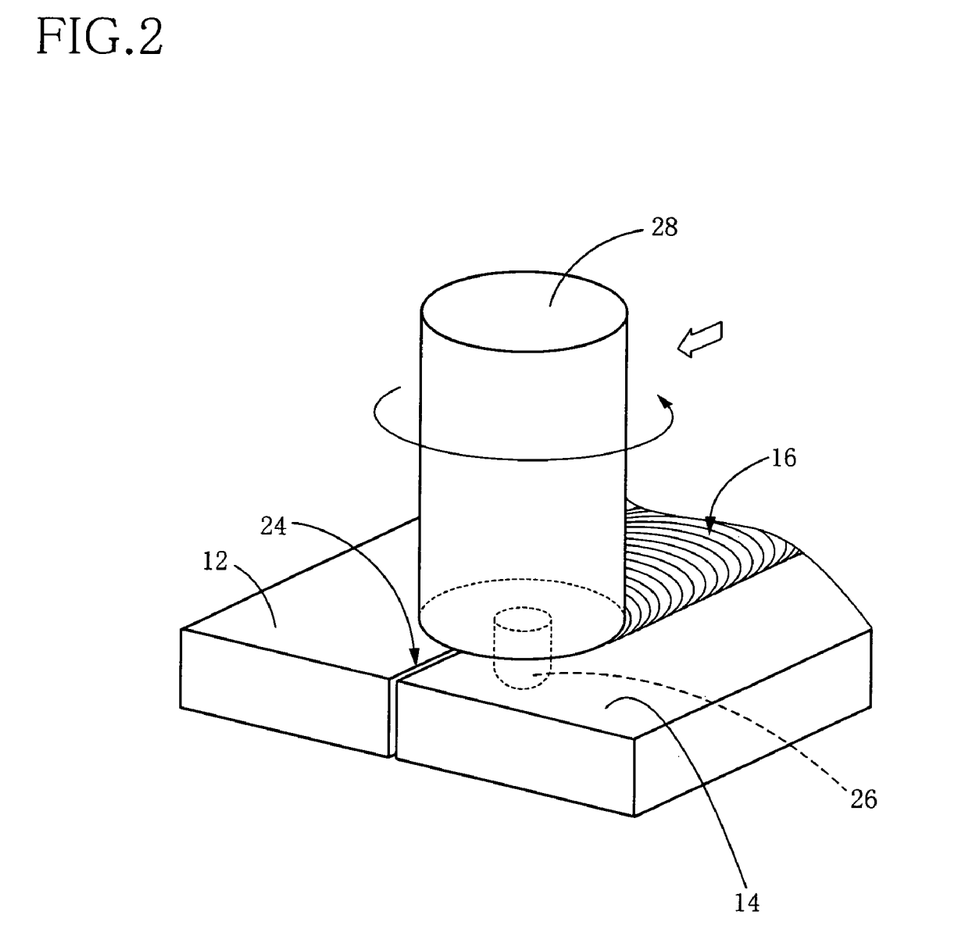
FIG. 2 is a view for explaining one example of a process of joining the aluminum alloy members according to the present method, the view showing a state in which a butted portion of the aluminum alloy members is subjected to a friction stir welding operation.

For obtaining the tailored blank 10, the two planar aluminum base material members 12, 14 are butted to each other at end portions thereof so as to contact each other and a known friction stir welding operation is performed on a butted portion (contact portion) 24, as shown in FIG. 2.

Described more specifically, for performing the friction stir welding operation, there is used a rod-like rotary jig 28 having at its leading end a pin 26 provided coaxially. The pin 26 is inserted in an initial end of the butted portion at which the friction stir welding operation is to be initiated while the pin 26 is rotated at a high speed together with the rotary jig 28 by a known rotary drive mechanism (not shown). Then, the rotary jig 28 is moved relative to the aluminum base material members 12, 14 along the butted portion 24, whereby the joining at the butted portion 24 proceeds.

Thus, there is generated frictional heat between: the pin 26 and the rotary jig 28 which are rotated integrally; and the two aluminum base material members 12, 14. Owing to the frictional heat, a portion around the butted portion 24 is permitted to be subjected to plastic deformation. In this state, the structure of the butted portion 24 of the aluminum base material members 12, 14 is stirred by the stirring action of the pin 26 rotating at a high speed, thereby forming a stir zone 16 along the butted portion 24. Thus, the two aluminum base material members 12, 14 are joined together without being melted. The stir zone 16 formed by the friction stir welding operation is held in a good or sound welded condition in which there exist no bonding defects such as blow holes, entrapping of slabs and the like peculiar to the fusion welding.

Here, the friction stir welding operation is performed on the butted portion 24 at which the two aluminum base material members 12, 14 are butted to each other. The friction stir welding operation may be performed otherwise. For instance, the two aluminum base material members 12, 14 are overlapped at respective end portions thereof so as to be in contact with each other and the friction stir welding operation may be performed on the overlapped portion based on a lap weld operation according to ordinary friction stir welding.

Thereafter, the underaging treatment is performed on a joined body that has been obtained such that the two aluminum base material members 12, 14 are joined integrally with each other by the friction stir welding operation.

The underaging treatment is an artificial aging treatment and is completed in a state in which the hardness of the stir zone and the hardness of the heat-affected zones are made larger than the hardness of the base material portions 20, 22 and before the hardness of the stir zone 16 reaches maximum hardness. More specifically explained referring to FIG. 3, a joined body 34 in which the two aluminum base material members 12, 14 are joined by the friction stir welding is immersed in oil 32 that is accommodated in an oil bath 30. In this state, the entirety of the joined body 34 is heated at a temperature lower than that in an artificial aging treatment in which an ordinary T4 treatment is carried out or heated for a time period shorter than that in such an artificial aging treatment.

Figure 3:
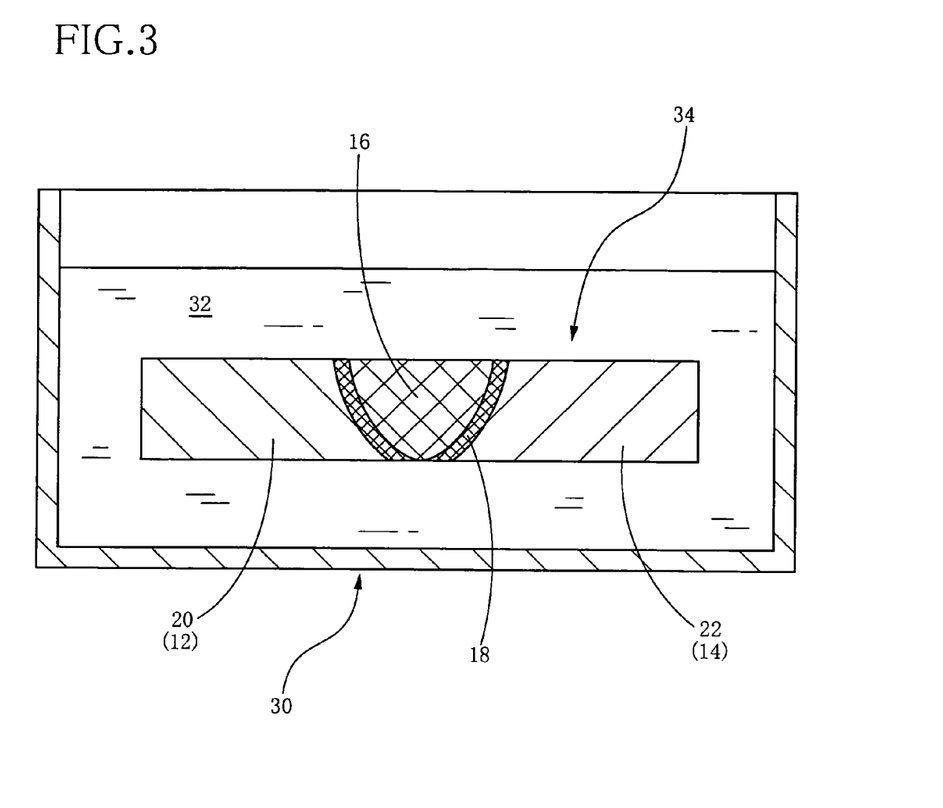
FIG. 3 is a view for explaining one example of a process performed following the process shown in FIG. 2, the view showing a state in which an underaging treatment is performed on a joined body obtained as a result of the friction stir welding operation performed on the aluminum alloy members.

The underaging treatment described above is performed on the joined product 34, thereby controlling the respective metal structures of the stir zone 16, the heat-affected zones 18 and the base material portions 20, 22 and the relationship in hardness among those.

Where the underaging treatment is performed on the joined body 34 of the aluminum base material members 12, 14 formed of the T4 temper 6000 series aluminum alloy members, the precipitation size of the $Mg_2Si$ compound which precipitates with the progress of aging is larger in the structure of the stir zone 16 than those of the heat-affected zones 18 and the base material portions 20, 22 since the aging speed of the stir zone 16 is higher than those of the heat-affected zones 18 and the base material portions 20, 22. Hence, the hardness of the stir zone 16 becomes higher than those of the heat-affected zones 18 and the base material portions 20, 22. The precipitation size of the $Mg_2Si$ compound in the structure of the heat-affected zones 18 is larger than that of the base material portions 20, 22 and smaller than that of the stir zone 16 since the aging speed of the heat affected-zones 18 is higher than that of the base material portions 20, 22 and lower than that of the stir zone 16. Hence, the hardness of the heat-affected zones 18 becomes higher than that of the base material portions 20, 22 and lower than that of the stir zone 16. The precipitation size of the $Mg_2Si$ compound in the structure of the base material portions 20, 22 is smaller than those of the stir zone 16 and the heat-affected zones 18 since the aging speed of the base material portions 20, 22 is lower than those of the stir zone 16 and the heat affected-zones 18. Hence, the hardness of the base material portions 20, 22 becomes lower than those of the stir zone 16 and the heat-affected zones 18.

Thus, the hardness of the joined body 34 is locally changed, after the completion of the underaging treatment performed on the joined body 34, such that the hardness of the stir zone 16 is the highest, the hardness of the heat-affected zones 18 is the second highest, and the hardness of the base material portions 20, 22 is the lowest. Thus, the tailored blank 10 is produced.

In the thus produced tailored blank 10, owing to the implementation of the underaging treatment, the hardness of the heat-affected zones 18 is made higher than that of the base material portions 20, 22 though it is made lower than that of the stir zone 16, whereby the tailored blank 10 does not suffer from occurrence of fracture at the heat-affected zones 18 due to stress concentration thereon when the tailored blank 10 is subjected to the press forming, unlike the conventional aluminum alloy joined product in which the hardness is the lowest at the heat-affected zones 18 existing in the limited narrow areas.

Further, in the tailored blank 10 constructed as described above, an increase in the hardness of the base material portions 20, 22 by the underaging treatment is minimized, thereby advantageously maintaining excellent workability inherent to the aluminum base material members 12, 14 which give the base material portions 20, 22 and which is made of the 6000 series aluminum alloy with T4 temper. Therefore, the amount of elongation by deformation of the base material portions 20, 22 in the press forming is sufficiently assured.

The underaging treatment should be performed after the friction stir welding operation on the joined product 34 before the GP zones are formed in the metal structure of the stir zone 16 due to natural aging, for instance. If the GP zones begin to be formed in the metal structure of the stir zone 16, the GP zones are also formed in the metal structure of the heat-affect zones 18, so that the respective metal structures of the stir zone 16 and the heat-affected zones 18 become similar to that of the base material portions 20, 22. As a result, the respective aging speeds of the stir zone 16, heat-affected zones 18 and base material portions 20, 22 become substantially equal to one another, making it difficult to control, by implementation of the underaging treatment, the respective structures of the stir zone 16, the heat-affected zones 18 and the base material portions 20, 22 and the relationship in hardness among those. In this case, it is quite difficult to obtain the effect of improving the welding or joining strength of the joined product 34 and the press formability assured by the underaging treatment. For preventing the effect assured by the underaging treatment from being lowered due to formation of the GP zones in the metal structure of the stir zone 16, it is preferable to carry out the underaging treatment on the joined product 34 promptly within 24 hours after the completion of the friction stir welding operation on the butted portion 24, more preferably within six hours.

As described above the underaging treatment on the joined product 34 is carried out by implementation of a heat treatment in which the joined product 34 is gradually heated using a heating device such as the oil bath 32 and, when the heating temperature reaches a predetermined level, the heating temperature is held at that level for a predetermined time period. The heating temperature is preferably within a range from about 150 to about 230° C., for instance, and the holding time at the temperature within that range is preferable within four hours.

Where the underaging treatment is carried out by implementation of a heat treatment at a temperature lower than 150° C., the age hardening in the entirety of the joined product 34 is insufficient, so that it may be difficult to control the relationship in hardness among the stir zone 16, the heat-affected zones 18 and the base material portions 20, 22. In this case, it may be difficult to obtain satisfactory effect of improving the joining strength and the press formability to be attained by the implementation of the underaging treatment. Where the underaging treatment is carried out at a temperature exceeding 230° C., on the other hand, there is a risk of occurrence of overaging in the joined product 34, resulting in softening of the entirety of the joined product 34. In this case, too, it is difficult to obtain the effect to be attained by the implementation of the underaging treatment. Where the time period during which the underaging treatment is carried out exceeds four hours, the amount of age hardening increases and the hardness increases to an excessive extent, so that the ductility is lowered, thereby lowering the press formability.

Where such a long time of the underaging treatment is carried out at a comparatively high temperature, the ductility is lowered due to averaging, causing a risk of deterioration in the press formability.

Therefore, the heating temperature in the underaging treatment is preferably kept in a range from about 150° C. to about 230° C. and the heating time at the temperature in the range is preferably within four hours, for the purpose of sufficiently and surely enhancing the joining strength and the press formability of the joined product 34 (the tailored blank 10) by implementation of the underaging treatment on the joined product 34. For more sufficiently obtaining the effect to be attained by implementation of the underaging treatment, the heating temperature in the underaging treatment is preferably kept in a range of 160-200° C. and the heating time at the temperature in the range is preferably within two hours.

In this connection, the lower limit of the heating time in the underaging treatment is not particularly limited. For instance, at a time point when the heating temperature reaches the target temperature as a result of the increase of the temperature in the oil bath 30, the temperature in the oil bath 30 may be lowered without holding at the target temperature, so that the heating time at the target temperature may be made substantially zero. Further, a rate of raising the heating temperature for heating the joined body 34 to the target temperature is suitably determined depending upon the target heating temperature, and the like, for instance. Because the optimum heating time in the underaging treatment largely depends on the heating temperature, the heating time in the underaging treatment is suitably determined depending upon the heating temperature.

The heating device used for heating the joined body 34 is not limited to the oil bath 30 described above. Among known heating devices, suitable one capable of heating the entirety of the joined product 34 at one time may be selected and employed. For instance, other than the oil bath 30, there may be suitably used, as the heating device, a salt bath, an air-heating furnace, an iron, an infrared heating device, an induction heating device, etc.

Where the heating device is selected from among those illustrated above, the selected heating device is usually disposed separately from a line for performing the friction stir welding operation. After the joined body 34 has been obtained as a result of implementation of the friction stir welding operation on the entirety of the butted portion 24 of the two aluminum base material members 12, 14, the obtained joined body 34 is transferred from the line for performing the friction stir welding operation to the location where the heating device is disposed and then subjected to the heat treatment by the heating device, so that the underaging treatment is performed on the joined body 34. For instance, a suitable heating device may be disposed behind a location of the rotary jig 28 used in the friction stir welding operation as viewed in the welding direction and the underaging treatment may be performed on the joined body 34 using the thus disposed heating device.

In that case, before completion of the joined body 34 in which the entirety of the two aluminum base material members 12, 14 are joined together, the underaging treatment is sequentially performed, by the heating device disposed behind the rotary jig 28 as viewed in the welding direction, on a portion of the aluminum base material members 12, 14 that has been formed into the joined body by formation of the stir zone 16, on the line for performing the friction stir welding operation on the butting portion 24, following the friction stir welding operation. Thus, the friction stir welding operation and the operation of performing the underaging treatment are continuously carried out, advantageously assuring high efficiency of those operations. Accordingly, the tailored blank 10 with high bonding or joining strength and excellent press formability can be quickly and efficiently obtained. The heating device to be used in the case where the friction stir welding operation and the underaging treatment are performed on the same line as descried above is not particularly limited. For instance, the infrared heating device and the induction heating device may be used. Any other known heating device may be suitably used.

The underaging treatment on the joined product 34 is preferably carried out such that tensile strength of the base material portions 20, 22 is increased within a range that does not exceed 20 MPa (up to 20 MPa), based on the increase in the hardness by the underaging treatment. If the hardness of the base material portions 20, 22 is increased to an extent at which the tensile strength thereof exceeds 20 MPa, the ductility of the base material portions 20, 22 is lowered, causing a risk of deteriorating the press formability of the joined product 34 (the tailored blank 10) as a whole.

As explained above, in the present embodiment, the friction stir welding operation is performed on the butted portion 24 of the two aluminum base material members 12, 14 to obtain the joined body 34, and the obtained joined body 34 is then subjected to the underaging treatment, thereby effectively and stably producing the tailored blank 10 with high joining or bonding strength and excellent press formability.

In the present embodiment, while there have been described the joined product for press forming (the tailored blank) that gives the inner member of the body panel of the automobiles and the method of joining together the aluminum alloy members that constitute the joined product, the principle of the invention is equally applicable to joining methods of joining together the aluminum alloy members employed for forming various kinds of aluminum alloy joined product and joined products which give various kinds of press product other than the inner member of the body panel of the automobiles and which are produced utilizing the such joining methods.

It is to be understood that the present invention may be embodied with various changes and modifications that may occur to those skilled in the art, without departing from a scope of the invention defined in attached claims.

EXAMPLES

To further clarify the present invention, some examples of the present invention will be described. It is to be understood that the present invention is not limited to the details of these examples and the foregoing description.

Example 1

There were obtained by a known DC casting method cast ingots formed of respective five kinds of 6000 series aluminum alloys (A-E) having respective chemical compositions shown in the following TABLE 1.

TABLE 1

| Alloy | Chemical composition (mass %) | | | | | | | | |
|---|---|---|---|---|---|---|---|---|---|
| | Si | Fe | Cu | Mn | Mg | Cr | Zn | Ti | Al |
| A | 0.41 | 0.14 | 0.04 | 0.07 | 0.5 | 0.03 | 0.02 | 0.03 | balance |
| B | 0.7 | 0.17 | 0.34 | 0.14 | 1.1 | 0.19 | 0.03 | 0.03 | balance |
| C | 1.0 | 0.14 | 0.01 | 0.09 | 0.5 | 0.02 | 0.01 | 0.03 | balance |

TABLE 1-continued

| Alloy | Chemical composition (mass %) | | | | | | | | |
|---|---|---|---|---|---|---|---|---|---|
| | Si | Fe | Cu | Mn | Mg | Cr | Zn | Ti | Al |
| D | 1.0 | 0.13 | 0.01 | 0.09 | 0.5 | 0.01 | 0.21 | 0.03 | balance |
| E | 1.0 | 0.12 | 0.7 | 0.07 | 0.4 | 0.02 | 0.01 | 0.03 | balance |

Subsequently, each of the cast ingots formed of the respective five kinds of alloys (A-E) was subjected to homogenization, hot-rolling and cold-rolling according to respective ordinary manners, thereby producing rolled plate members each having thickness of 1.0 mm. The rolled plate members formed of the respective five kinds of alloys (A-E) were subjected to a solution heat treatment and quenching into water according to an ordinary manner and then naturally aged at room temperature for seven days. Thus, the rolled plate members were subjected to the T4 treatment, whereby five kinds of T4 temper 6000 series aluminum alloy members having mutually different chemical compositions were prepared.

Subsequently, two of the aluminum alloy members for each of the five kinds, namely, two aluminum alloy members having the same chemical composition were butted to each other in the rolled direction thereof (in the longitudinal direction thereof). Then, the friction stir welding operation was performed on a butted portion of the two aluminum alloy members. Thus, there were obtained five kinds of aluminum alloy joined products whose base materials had mutually different chemical compositions. Here, one aluminum alloy joined product was obtained for each of the five kinds. Accordingly, five aluminum alloy joined products in total were obtained. The friction stir welding operation was performed under conditions in which a rotary pin tool made of steel was roated at 1000 rpm and moved horizontally at a speed of 400 mm/minute. The rotary pin tool was provided at its end with eight grooves each having a depth of 1 mm for the purpose of chipping or scraping.

Each of the thus obtained five kinds of aluminum alloy joined products was accommodated in an oil bath within one hour after termination of the friction stir welding operation and the underaging treatment was performed on those joined products at 175° C. for 15 minutes. Thereafter, the joined products were stored at 20° C. for seven days, thereby producing five kinds of test members 1-5 shown in the following TABLE 2.

The hardness distribution in each of the thus obtained test members 1-5 was examined as follows: Initially, an elongate specimen was cut from each of the test members 1-5 such that a line of joining of the base material portions was located at the middle of the specimen. Then, the specimen was embedded in a resin and was ground at its cut plane. The hardness values of the stir zone, heat-affected zones and base material portions was respectively measured using a Vickers hardness tester with a load of 1 kgf. The results are also indicated in TABLE 2.

For examining bonding or joining strength and braking elongation of each of the five kinds of test members 1-5, apart from the specimens used for measuring the Vickers hardness as described above, a rectangular specimen defined in ASTM B 557-94 was cut from each test member 1-5 such that the line of joining of the base material portions was located, at the middle of the specimen, so as to extend in a direction perpendicular to a tensile direction in a tensile test described below. Each of the specimens produced from the respective test members 1-5 was subjected to the tensile test at room temperature in accordance with ASTM B 557-94 for measuring tensile strength, yield strength, and breaking elongation between reference points that were spaced apart from each other by a distance of 50 mm as a gage length. Further, it was visually inspected which one of the stir zone, heat-affected zones and base material portions suffered from fracture or breakage. (Namely, a fractured position was inspected for each test member). The results are also indicated in TABLE 2

For examining press formability of the test members 1-5, apart from the specimens used for measuring the breaking elongation as described above, a circular specimen with a diameter of 120 mm was cut from each of the test members 1-5 such that the line of joining of the base material portions was located at the center of the specimen. After each of five kinds of circular specimens obtained from the respective test members 1-5 was coated on a surface thereof with a low viscous lubricant, a bulging operation was conducted using an Erichsen tester so as to measure a forming limit height. The bulging operation was conducted using a hemispherical punch with a diameter of 50 mm at a forming rate of 2.0 mm/second with a blank-holding pressure of 40 kN. In the bulging operation, there were used dies for holding the specimen with a lock bead formed on its entire periphery and having a width of 3 mm and a height of 0.5 mm, for preventing a peripheral portion of the specimen from flowing toward a central portion. The results are also indicated in TABLE 2.

TABLE 2

| Test member | Alloy | Vickers hardness | | | Tensile strength (MPa) | Yield strength (MPa) | Breaking Elongation (%) | Fractured position | Forming limit height (mm) |
|---|---|---|---|---|---|---|---|---|---|
| | | Stir zone | Heat-affected zones | Base material portions | | | | | |
| 1 | A | 66 | 61 | 55 | 185 | 92 | 16 | base material | 15.1 |
| 2 | B | 87 | 80 | 73 | 243 | 135 | 17 | base material | 16.0 |
| 3 | C | 88 | 80 | 73 | 244 | 140 | 18 | base material | 16.9 |
| 4 | D | 89 | 81 | 74 | 248 | 138 | 18 | base material | 16.8 |
| 5 | E | 95 | 87 | 79 | 268 | 149 | 18 | base material | 17.4 |

As apparent from the results shown in the above TABLE 2, in any of the test members 1-5 in each of which the aluminum alloy members made of the 6000 series aluminum alloy with T4 temper were joined together according to the present method, the hardness of the stir zone is the highest, the hardness of the heat-affected zones is the second highest and the hardness of the base material portions is the lowest. Further, all of the test members 1-5 exhibit large values of breaking elongation not smaller than 16% and large values of forming limit height not smaller than 15 mm. Moreover, in any of the test members 1-5, fracture occurred at the base material portions.

It is therefore clearly recognized that the joining or bonding strength can be sufficiently enhanced and the press formability can be effectively improved by performing, according to the present method, the underaging treatment after the aluminum alloy members made of the 6000 series aluminum alloy with T4 temper have been joined together by the friction stir welding.

Comparative Example 1

For comparison, using two of the T4 temper 6000 series aluminum alloy members which were made of each of the five kinds of alloys (A-E) having respective different chemical compositions and which were prepared in the above Example 1, the friction stir welding operation was performed under conditions similar to those in the Example 1. Thus, there were obtained five kinds of aluminum alloy joined products whose base materials had mutually different chemical compositions. Here, one aluminum alloy joined product was obtained for each of the five kinds. Accordingly, five aluminum alloy joined products in total were obtained.

Thereafter, each of the thus obtained five kinds of aluminum alloy joined products was stored at 20° C. for seven days without performing the underaging treatment after the termination of the friction stir welding operation. Thus, five kinds of test members 6-10 shown in the following TABLE 3 were produced.

As in the above Example 1, the Vickers hardness values of the stir zone, the heat-affected zones and the base material portions were respectively measured for each of those five kinds of test members 6-10. Further, the tensile strength, the yield strength, the breaking elongation, the forming limit height and the fractured position in the tensile test were examined for each of the test members 6-10. The results are also indicated in TABLE 3.

and the hardness of the heat-affected zones is the lowest. Those test members 6-10 have small values of breaking elongation not greater than 13% and small values of forming limit height less than 15 mm. Further, in any of the test members 6-10, fracture occurred at the heat-affected zones in the tensile test. These results indicate the low joining or bonding strength and the deteriorated press formability of the aluminum alloy joined products formed in a conventional manner that the aluminum alloy members formed of the 6000 series aluminum alloy with T4 temper were simply joined together by the friction stir welding.

Comparative Example 2

For comparison, using two of the T4 temper 6000 series aluminum alloy members which were made of each of the five kinds of alloys (A-E) having respective different chemical compositions and which were prepared in the above Example 1, the friction stir welding operation was performed under conditions similar to those in the Example 1. Thus, there were obtained five kinds of aluminum alloy joined products whose base materials have the chemical compositions which differ kind to kind. Here, three aluminum alloy joined product were obtained for each of the five kinds. Accordingly, fifteen aluminum alloy joined products in total were obtained.

Thereafter, each of the thus obtained fifteen aluminum joined products of the five kinds was accommodated in an oil bath at room temperature within one hour after the friction stir welding operation and the aluminum joined products were subjected to an artificial aging treatment under respective heating conditions as indicated in the following TABLE 4. Then, the aluminum joined products were stored at 20° C. for seven days. Thus, there were produced five kinds of test members 11-25 whose base materials had the chemical compositions which differ kind to kind.

TABLE 3

| Test member | Alloy | Vickers hardness | | | Tensile strength (MPa) | Yield strength (MPa) | Breaking Elongation (%) | Fractured position | Forming limit height (mm) |
|---|---|---|---|---|---|---|---|---|---|
| | | Stir zone | Heat-affected zones | Base material portions | | | | | |
| 6 | A | 54 | 49 | 56 | 160 | 93 | 11 | Heat-affected zones | 12.5 |
| 7 | B | 72 | 65 | 74 | 215 | 135 | 13 | Heat-affected zones | 12.8 |
| 8 | C | 71 | 64 | 73 | 210 | 141 | 12 | Heat-affected zones | 13.9 |
| 9 | D | 73 | 66 | 75 | 220 | 138 | 12 | Heat-affected zones | 13.6 |
| 10 | E | 77 | 69 | 80 | 228 | 150 | 13 | base material | 14.2 |

Although the test members 6-10 were obtained by the friction stir welding of the aluminum alloy members made of the 6000 series aluminum alloy with T4 temper, these test members 6-10 were not subjected to any underaging treatment after the friction stir welding. As apparent from the results shown in the above TABLE 3, in any of those test members 6-10, the hardness of the base material portions is the highest, the hardness of the stir zone is the second highest As in the above Example 1, the Vickers hardness values of the stir zone, the heat-affected zones and the base material portions were respectively measured for each of those five kinds of test members 11-25. Further, the tensile strength, the yield strength, the breaking elongation, the forming limit height and the fractured position in the tensile test were examined for each of the test members 11-25. The results are also indicated in TABLE 4.

TABLE 4

| Test member | Alloy | Underaging treatment | | Vickers hardness | | | Tensile strength (MPa) | Yield strength (MPa) | Breaking elongation (%) | Fractured position | Forming limit height (mm) |
| | | Temperature (° C.) | Time (second) | Stir zone | Heat-affected zones | Base material | | | | | |
|---|---|---|---|---|---|---|---|---|---|---|---|
| 11 | A | 120 | 30 | 58 | 50 | 55 | 162 | 92 | 12 | Heat-affected zones | 12.4 |
| 12 | A | 250 | 30 | 46 | 45 | 44 | 130 | 84 | 11 | Base material | 10.9 |
| 13 | A | 170 | 480 | 71 | 68 | 70 | 225 | 209 | 7 | Heat-affected zones | 10.3 |
| 14 | B | 120 | 30 | 75 | 66 | 74 | 217 | 135 | 12 | Heat-affected zones | 12.7 |
| 15 | B | 250 | 30 | 62 | 61 | 59 | 174 | 129 | 11 | Base material | 11.1 |
| 16 | B | 170 | 480 | 95 | 92 | 95 | 308 | 266 | 9 | Heat-affected zones | 10.7 |
| 17 | C | 120 | 30 | 75 | 66 | 74 | 211 | 140 | 13 | Heat-affected zones | 13.8 |
| 18 | C | 250 | 30 | 63 | 62 | 58 | 170 | 132 | 11 | Base material | 12.2 |
| 19 | C | 170 | 480 | 94 | 90 | 93 | 300 | 242 | 12 | Heat-affected zones | 11.9 |
| 20 | D | 120 | 30 | 77 | 68 | 75 | 222 | 138 | 13 | Heat-affected zones | 13.7 |
| 21 | D | 250 | 30 | 64 | 62 | 59 | 175 | 128 | 10 | Base material | 12.3 |
| 22 | D | 170 | 480 | 96 | 92 | 97 | 305 | 244 | 12 | Heat-affected zones | 12.0 |
| 23 | E | 120 | 30 | 82 | 71 | 81 | 229 | 151 | 12 | Heat-affected zones | 14.3 |
| 24 | E | 250 | 30 | 66 | 64 | 62 | 183 | 135 | 11 | Base material | 12.5 |
| 25 | E | 170 | 480 | 106 | 102 | 107 | 341 | 286 | 10 | Heat-affected zones | 12.0 |

As apparent from the results shown in the above TABLE 2 and TABLE 4, although the test members 12, 15, 18, 21 and 24 of the five kinds were obtained by the friction stir welding of the aluminum alloy members made of the 6000 series aluminum alloy with T4 temper, those test members 12, 15, 18, 21 and 24 suffer from lower hardness values of the stir zone, the heat-affected zones and the base material portions than those in the test members 1-5 in each of which the aluminum alloy members made of the 6000 series aluminum alloy with T4 temper were joined according to the present method, for the following reasons: Namely, in each of those test members, the artificial aging treatment was performed, after the friction stir welding, on the joined product obtained by the friction stir welding at an excessively high heating temperature of 250° C. Therefore, it seems that those test members suffered from softening as a result of overaging due to the artificial aging treatment performed at the excessively high heating temperature.

Although the test members 13, 16, 19, 22 and 25 of the five kinds were obtained by the friction stir welding of the aluminum alloy members made of the 6000 series aluminum alloy with T4 temper, those test members 13, 16, 19, 22 and 25 suffer from excessively higher hardness values of the stir zone, the heat-affected zones and the base material portions than those in the test members 1-5 in each of which the aluminum alloy members made of the 6000 series aluminum alloy with T4 temper were joined according to the present method, for the following reasons: Namely, in each of those test members, the artificial aging treatment was performed, after the friction stir welding, on the joined product obtained by the friction stir welding, for an excessively long time period of 480 minutes. Therefore, it seems that those test members suffered from excessive age-hardening amounts due to the artificial aging treatment conducted for the excessively long time period.

As apparent from the results shown in the above TABLE 4, although the test members 11, 14, 17, 20 and 23 of the five kinds were obtained by the friction stir welding of the aluminum alloy members made of the 6000 series aluminum alloy with T4 temper, the hardness of the heat-affected zones is the lowest and the hardness of the stir zone and the hardness of the base material portions are substantially equal to each other in each of those test members, for the following reasons: Namely, in each of those test members, the artificial aging treatment was performed, after the friction stir welding, at an excessively low heating temperature of 120° C. on the joined product obtained by the friction stir welding. Therefore, it seems that those test members suffered from insufficient age hardening due to the artificial aging treatment performed at the excessively low heating temperature.

As apparent from the results shown in the above TABLE 4, any of the fifteen test members subjected to the artificial aging treatment at the high temperature, at the low temperature, or for the long time period have small values of breaking elongation not greater than 13% and small values of forming limit height not greater than 15 mm. Further, fracture occurred at the heat-affected zones in each of those test members. It is clearly recognized from these results that the joining or bonding strength can be sufficiently increased and the press formability can be effectively improved by performing the underaging treatment surely at a suitable temperature for a suitable time period after the friction stir welding of the aluminum alloy members made of the 6000 series aluminum alloy with T4 temper.

Comparative Example 3

For comparison, using two of the T4 temper 6000 series aluminum alloy members which were made of each of the five kinds of alloys (A-E) having respective different chemical compositions and which were prepared in the above Example 1, the friction stir welding operation was performed under conditions similar to those in the Example 1. Thus, there were obtained five kinds of aluminum alloy joined products whose base materials had mutually different chemical compositions. Here, one aluminum alloy joined product was obtained for each of the five kinds. Accordingly, five aluminum alloy joined products in total were obtained.

Thereafter, each of the thus obtained aluminum alloy joined products of the five kinds was stored at room temperature for 72 hours after the friction stir welding operation. Then, with each aluminum alloy joined product accommodated in an oil bath, the underaging treatment was performed by heating each aluminum alloy joined product at 175° C. for 15 minutes. Thereafter, the joined products were stored at 20° C. for seven days, thereby producing five kinds of test members 26-30 shown in the following TABLE 5.

As in the above Example 1, the Vickers hardness values of the stir zone, the heat-affected zones and the base material portions were respectively measured for each of those five kinds of test members 26-30. Further, the tensile strength, the yield strength, the breaking elongation, the forming limit height and the fractured position in the tensile test were examined for each of the test members 26-30. The results are also indicated in TABLE 5

TABLE 5

| Test member | Alloy | Vickers hardness | | | Tensile strength (MPa) | Yield strength (MPa) | Breaking Elongation (%) | Fractured position | Forming limit height (mm) |
| --- | --- | --- | --- | --- | --- | --- | --- | --- | --- |
| | | Stir zone | Heat-affected zones | Base material portions | | | | | |
| 26 | A | 54 | 59 | 56 | 181 | 94 | 12 | stir zone | 13.5 |
| 27 | B | 74 | 78 | 75 | 244 | 136 | 13 | stir zone | 13.8 |
| 28 | C | 72 | 79 | 73 | 238 | 142 | 14 | stir zone | 14.1 |
| 29 | D | 74 | 81 | 75 | 245 | 139 | 14 | stir zone | 14.2 |
| 30 | E | 80 | 85 | 81 | 267 | 150 | 13 | stir zone | 14.6 |

As apparent from the result shown in the above TABLE 5, although each of the test members 26-30 was obtained by the friction stir welding of the aluminum alloy members made of the 6000 series aluminum alloy with T4 temper, the hardness of the stir zone is the lowest in each of those test members 26-30 for the following reasons: Namely, in each of those test members, the joined product obtained by the friction stir welding was stored, after the friction stir welding, at room temperature for 72 hours before initiation of the underaging treatment. Therefore, during the storage for the long period of time after the friction stir welding operation, natural aging proceeded, so that the stir zone had a metal structure in which the GP zones were formed. Accordingly, irrespective of the implementation of the underaging treatment, the relationship in hardness among the stir zone, the heat-affected zones and the base material portions could not be controlled.

These test members 26-30 have small values of breaking elongation not greater than 14% and small values of forming limit height not greater than 15 mm. Further, fracture occurred at the stir zone in each of those test members. It is clearly recognized from these results that the joining or bonding strength can be sufficiently increased and the press formability can be effectively improved by performing, after the friction stir welding of the aluminum alloy members made of the 6000 series aluminum alloy with T4 temper, the underaging treatment surely before the GP zones are formed in the stir zone.

What is claimed is:

1. A method of joining aluminum alloy members, comprising the steps of:

contacting aluminum alloy members each made of a 6000 series aluminum alloy with T4 temper and performing a friction stir welding operation on a contact portion of the aluminum alloy members at which they are held in contact with each other, so as to obtain a joined body including (i) a stir zone formed by a frictional heat generated by a stirring action of a pin which is inserted into the contact portion of the aluminum alloy members, (ii) a heat-affected zone also softened by the heat generated by the friction stir welding and located outwardly of the stir zone, and (iii) a base material portion of the aluminum alloy members other than the stir zone and the heat-affected zone;

performing, on the joined body within 24 hours after completion of the friction stir welding operation, an underaging treatment which is an artificial aging treatment; and completing the underaging treatment before hardness of the stir zone reaches maximum hardness, wherein the underaging treatment is performed before GP zones are formed at the stir zone of the joined body, and is a heat treatment in which the joined body is heated at a temperature of 160-200° C. for not longer than two hours, whereby the hardness of the stir zone is the highest, with a hardness of the heat-affected zone being the second highest, and a hardness of the base material portion being the lowest.

2. The method according to claim 1, wherein the underaging treatment is performed using a heating means selected from a salt bath, an oil bath, an air-heating furnace, an iron, infrared heating and induction heating.

3. The method according to claim 1, wherein the underaging treatment is sequentially performed on a portion of the aluminum alloy members that has been formed into the joined body by formation of the stir zone, following the formation of the stir zone at the contact portion of the aluminum alloy members by performing the friction stir welding operation on the contact portion.

4. The method according to claim 1, wherein the aluminum alloy members to be joined have the same thickness.

5. The method according to claim 1, wherein a rod-like rotary jig having at its leading end a pin provided coaxially is used to perform the friction stir welding operation.

6. The method according to claim 1, wherein the friction stir welding operation is performed on a butted portion of the aluminum alloy members.

7. A joined product for press forming constituted by a joined body, the joined body being obtained by integrally joining aluminum alloy members each made of a 6000 series aluminum alloy with T4 temper, at a contact portion thereof at which the aluminum alloy members are held in contact with each other, such that a stir zone is formed at the contact portion with a heat-affected zone formed outwardly of the stir zone, wherein:

the stir zone and the heat-affected zone are formed by performing a friction stir welding operation on the contact portion of the aluminum alloy members and are softened by heat generated by the friction stir welding operation; and the joined body is subjected, before GP zones are formed at the stir zone, to an underaging treatment which is an artificial aging treatment and the underaging treatment is completed before hardness of the stir zone reaches maximum hardness, whereby the hardness of the stir zone is the highest, with a hardness of the heat-affected zone being the second highest, and a hardness of the base material portion being the lowest.

* * * * *